(12) United States Patent
Stroberger et al.

(10) Patent No.: US 7,376,805 B2
(45) Date of Patent: May 20, 2008

(54) DISTRIBUTED STORAGE ARRAY

(75) Inventors: Christopher Stroberger, Colorado Springs, CO (US); Susan Spence, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 238 days.

(21) Appl. No.: 11/409,471

(22) Filed: Apr. 21, 2006

(65) Prior Publication Data

US 2007/0250672 A1    Oct. 25, 2007

(51) Int. Cl.
G06F 12/16    (2006.01)

(52) U.S. Cl. .................................. 711/162; 707/204

(58) Field of Classification Search ................ 711/161, 711/162; 707/204
See application file for complete search history.

(56) References Cited

U.S. PATENT DOCUMENTS

| | | | |
|---|---|---|---|
| 3,984,817 | A | 10/1976 | Barbour et al. |
| 5,504,861 | A | 4/1996 | Crockett et al. |
| 5,682,513 | A | 10/1997 | Candelaria et al. |
| 5,745,693 | A | 4/1998 | Knight et al. |
| 5,754,855 | A | 5/1998 | Miller et al. |
| 5,870,537 | A | 2/1999 | Kern et al. |
| 6,035,412 | A | 3/2000 | Tamer et al. |
| 6,148,338 | A | 11/2000 | Lachelt et al. |
| 6,304,980 | B1 | 10/2001 | Beardsley et al. |
| 6,662,281 | B2 | 12/2003 | Ballard et al. |
| 6,728,751 | B1 | 4/2004 | Cato et al. |
| 6,745,303 | B2 | 6/2004 | Watanabe |
| 6,883,065 | B1 | 4/2005 | Pittelkow et al. |
| 6,915,315 | B2 | 7/2005 | Autrey et al. |
| 6,952,737 | B1 | 10/2005 | Coates et al. |
| 6,961,870 | B2 | 11/2005 | Chiu et al. |
| 7,003,645 | B2 | 2/2006 | Knop et al. |
| 7,133,983 | B2 * | 11/2006 | Bartfai et al. ................ 711/161 |
| 2002/0116661 | A1 | 8/2002 | Thomas et al. |
| 2004/0250029 | A1 | 12/2004 | Ji et al. |
| 2004/0250031 | A1 | 12/2004 | Ji et al. |

OTHER PUBLICATIONS

Chandy, K. Mani, Lamport, Leslie, "Distributed Snapshots: Determining Global States of a Distributed System," ACM Transactions on Computer Systems 3, 1 (Feb. 1985), 63-75.

Ji, Minwen, Veitch, Alistair, Wilkes, John, "Seneca: remote mirroring done write," Proceedings of USENIX Technical Conference, Berkeley, CA, Jun. 2003, 253-268.

Frølund, "FAB: enterprise storage systems on a shoestring," Published at the Nineth Workshop on Hot Topics in Operating Systems (HotOS IX), Hawaii, May 2003.

* cited by examiner

*Primary Examiner*—Jack Lane (57) ABSTRACT

Systems and methods for asynchronous backup of virtual disks in a distributed storage array are disclosed. An exemplary method may comprise receiving an IO stream at the virtual disks in the distributed storage array, writing data to one or more storage cells of the virtual disks in the distributed storage array, and logging completed writes in a first batch for each of the one or more storage cells. The method also comprises establishing a consistency point in the IO stream, terminating logging to the first batch for each of the one or more storage cells at the consistency point and logging completed writes after the consistency point to a new batch for each of the one or more storage cells. The method also comprises transferring writes logged in the first batch to at least one remote storage so that the at least one remote storage is crash consistent.

11 Claims, 7 Drawing Sheets

DISTRIBUTED STORAGE ARRAY

BACKGROUND

Storage devices commonly implement data redundancy operations (also referred to as mirroring or back-up operations) for data recovery. Although entire storage devices may be copied onto secondary or redundant storage devices periodically as a means of backing up the data, more sophisticated data redundancy operations only record the changes to redundant storage devices.

Synchronous data redundancy operations record write operations at a primary storage device and at the redundant storage device before the operation is completed. Asynchronous data redundancy operations record write operations at a primary storage device during normal operation, and then update one or more redundant storage device with any changes at a later time. For example, the redundant storage device may be updated with changes during off-peak hours to reduce delays during normal operation.

These techniques require that any changes to the primary storage device be transferred to the redundant storage device in the same order in which the changes occurred at the primary storage device so that the redundant storage device is a true copy of the primary storage device at a definable point in time. In distributed storage arrays, multiple transactions may arrive simultaneously at different storage cells, making it difficult to know which transactions arrived first, given the skew between timestamps on different storage cells and variations in network performance. In addition, the first transaction to arrive at a storage cell may not be the first to complete.

DETAILED DESCRIPTION

Briefly, a batching mechanism may be implemented for asynchronous backup of virtual disks in a distributed storage array. All writes to a storage cell in the virtual disk are logged in a first batch, and then a consistency point is established in the IO (input/output) stream for terminating the first batch before starting a second batch for the storage cell. The batches for all of the storage cells in the storage array are terminated simultaneously. All writes made to the storage cell up to the consistency point are then copied from the first batch to a redundant storage device or "remote storage," while writes which completed at the storage cell after the consistency point are logged in the second batch (and so on). During a data recovery operation, client computing devices can access a mirror image of the data from the remote storage which is current to the consistency point.

Before continuing, it is noted that exemplary operations described herein for asynchronous backup of virtual disks in a distributed storage array may be embodied as logic instructions on a computer-readable medium. When executed on a processor, the logic instructions cause a general purpose computing device to be programmed as a special-purpose machine that implements the described operations.

Figure 1:
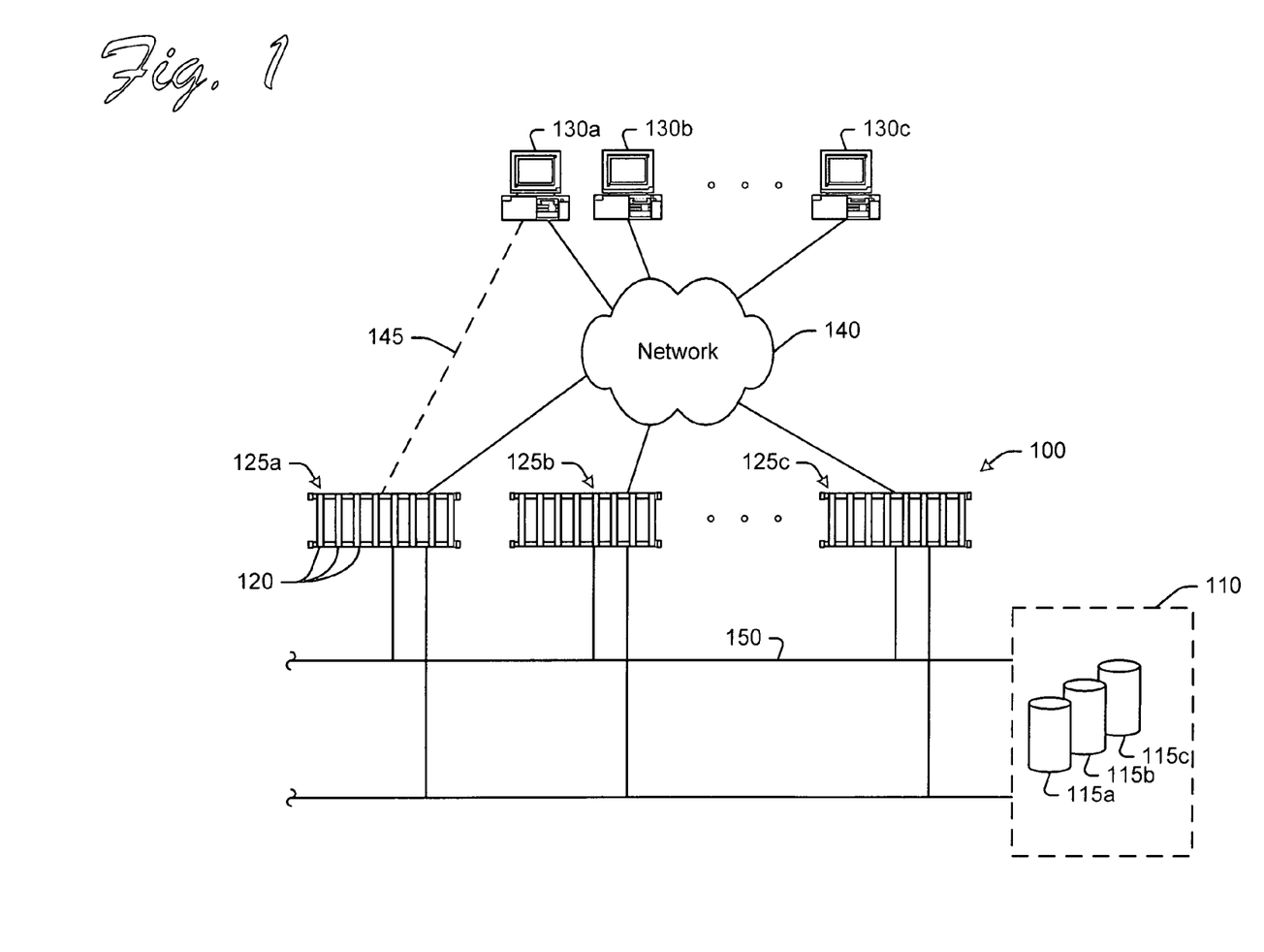
FIG. 1 is a diagram showing an exemplary distributed storage array with remote storage.

FIG. 1 is a diagram showing an exemplary distributed storage array 100 with remote storage 110. The distributed storage array 100 may include a plurality of storage cells (illustrated by storage cells 120). The storage cells 120 may be logically grouped into one or more virtual disks 125a-c which may be accessed by one or more client computing device 130a-c (also referred to as "clients"). In an exemplary embodiment, the clients 130a-c may be connected to distributed storage array 100 via a communications network 140 and/or direct connection (illustrated by dashed line 145). The communications network 140 may include one or more local area network (LAN) and/or wide area network (WAN).

Before continuing, it is noted that the term "distributed storage array" is used herein to mean multiple semi-autonomous "cells". Each cell is a fully functional server with a processor, memory, network interfaces, and disk storage. The cells each run a specialized software package which allows them to coordinate their actions and present the functionality of a traditional disk-based storage array to client hosts. The distributed array presents virtual disks to client hosts, and a unified management interface. The data for the virtual disks presented by the distributed array is itself distributed amongst the cells of the array. Redundancy and recovery schemes are utilized to safeguard against the failure of any cell. Client hosts are able to make a connection to any cell, and utilize the full data capacity of the distributed array. I/O requests (reads and writes) from the client hosts to the distributed array are satisfied by relevant subsets of the cells in the array, which coordinate their data and operational states and determine the correct response.

It is also noted that the terms "client computing device" and "client" as used herein refer to a computing device through which one or more users may access the distributed storage array 100. The computing devices may include any of a wide variety of computing systems, such as stand-alone personal desktop or laptop computers (PC), workstations, personal digital assistants (PDAs), or appliances, to name only a few examples. Each of the computing devices may include memory, storage, and a degree of data processing capability at least sufficient to manage a connection to the distributed storage array 100 via network 140 and/or direct connection 145.

The distributed storage array 100 may be communicatively coupled to remote storage 110 e.g., via a back-end network 150 or direct connection. Remote storage 110 may include one or more storage devices 115a-c for mirroring data stored on one or more of the storage cells 120 in distributed storage array 100. In an exemplary embodiment, remote storage 110 may be physically located in close proximity to the distributed storage array 100. In another exemplary embodiment, at least a portion of the remote storage 110 may be "off-site" or physically remote from the distributed storage array 100, e.g., to provide a further degree of data protection.

Figure 2:
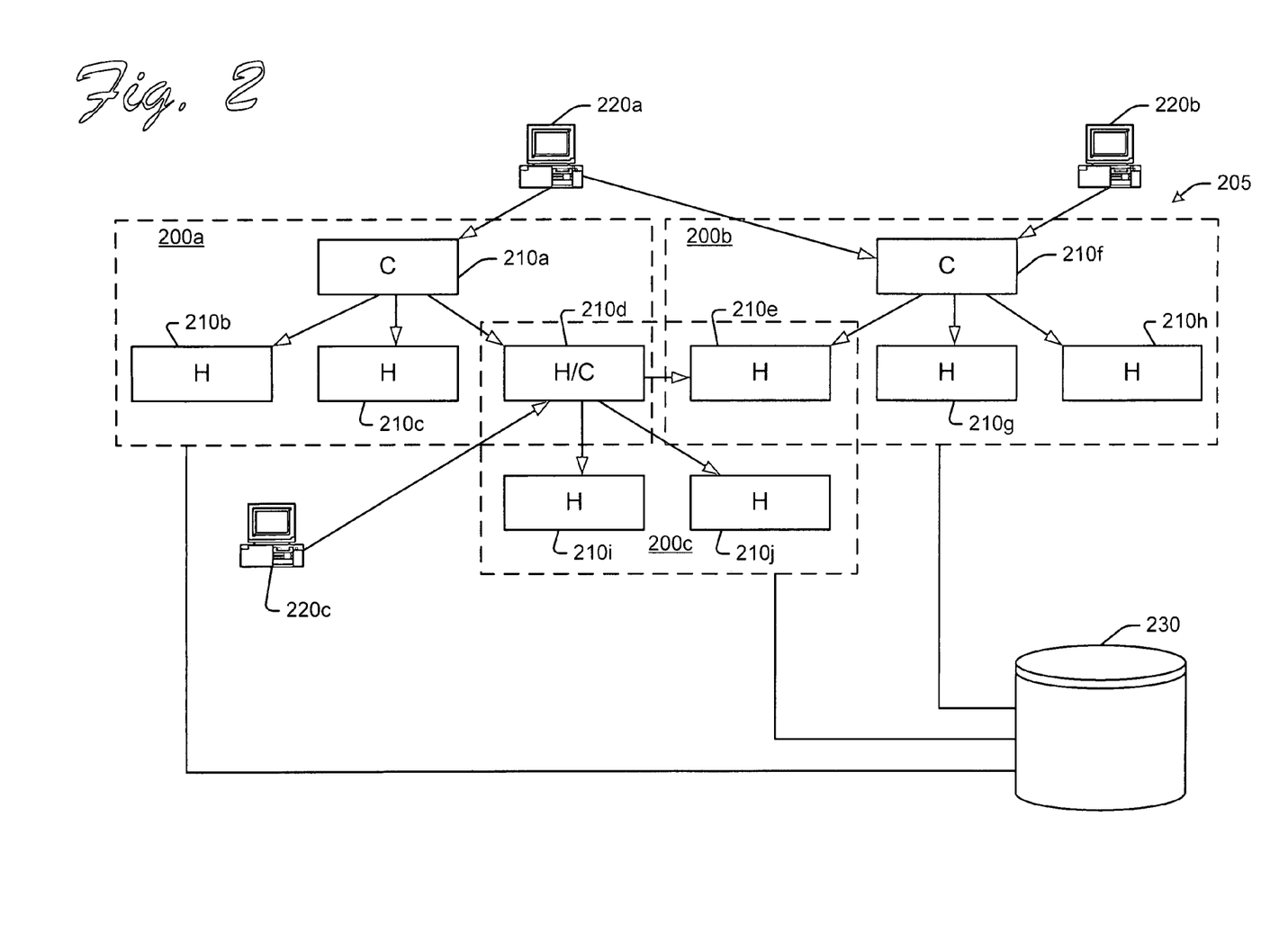
FIG. 2 is a diagram showing exemplary virtual disks in a distributed storage array.

FIG. 2 is a diagram showing exemplary virtual disks 200a-c in a distributed storage array 205, such as the virtual disks 125a-c shown in FIG. 1. Each virtual disk 200a-c may include a logical grouping of storage cells. For purposes of illustration, virtual disk 200a is shown including storage cells 210a-d, virtual disk 200b is shown including storage cells 210e-h, and virtual disk 200c is shown including storage cells 210d-e and 210i-j. Although the storage cells (generally referred to by reference 210) may reside at different locations within the distributed storage array 205, each virtual disk 200a-c appears to the client(s) 220a-c as an individual storage device or "disk".

When a client (generally referred to by reference 220) accesses a virtual disk 200a-c (e.g., for a read/write operation), a storage cell 210 is assigned as a coordinator (C). The coordinator (C) coordinates transactions between the client 220 and data handlers (H) for the virtual disk. For example, storage cell 210a is assigned as the coordinator (C) for virtual disk 200a, storage cell 210f is assigned as the coordinated (C) for virtual disk 200b, and storage cell 200d is assigned as the coordinator (C) for virtual disk 200c.

It is noted that the coordinator (C) is the storage cell that the client sent the request to, but the storage cells 210 do not need to be dedicated as either coordinators (C) and/or data handlers (H). A single virtual disk may have many coordinators simultaneously, depending on which cells receive the write requests. In other words, coordinators are assigned per write to a virtual disk, rather than per virtual disk. In an exemplary embodiment, a storage cell 210 may be a data handler (H) for a virtual disk while also serving as a coordinator (C) for another virtual disk. In FIG. 2, for example, storage cell 210d is a data handler (H) for virtual disk 200a while also serving as a coordinator (C) for virtual disk 200c. It is also noted that a storage cell 210 may serve as a data handler (H) for more than one virtual disk. In FIG. 2, for example, storage cell 210e is a data handler (H) for both virtual disk 200b and virtual disk 200c.

A redundant copy of the data stored in virtual disks 200a-c may be maintained on a remote storage 230. In an exemplary embodiment all writes (e.g., by a client 220) to a virtual disk 200 are logged in a batch (see, e.g., batches 310a-c in FIG. 3) for each of the storage cells 210. The batch may then be used to copy completed writes to the remote storage 230, as described in more detail with reference to FIG. 3.

Figure 3:
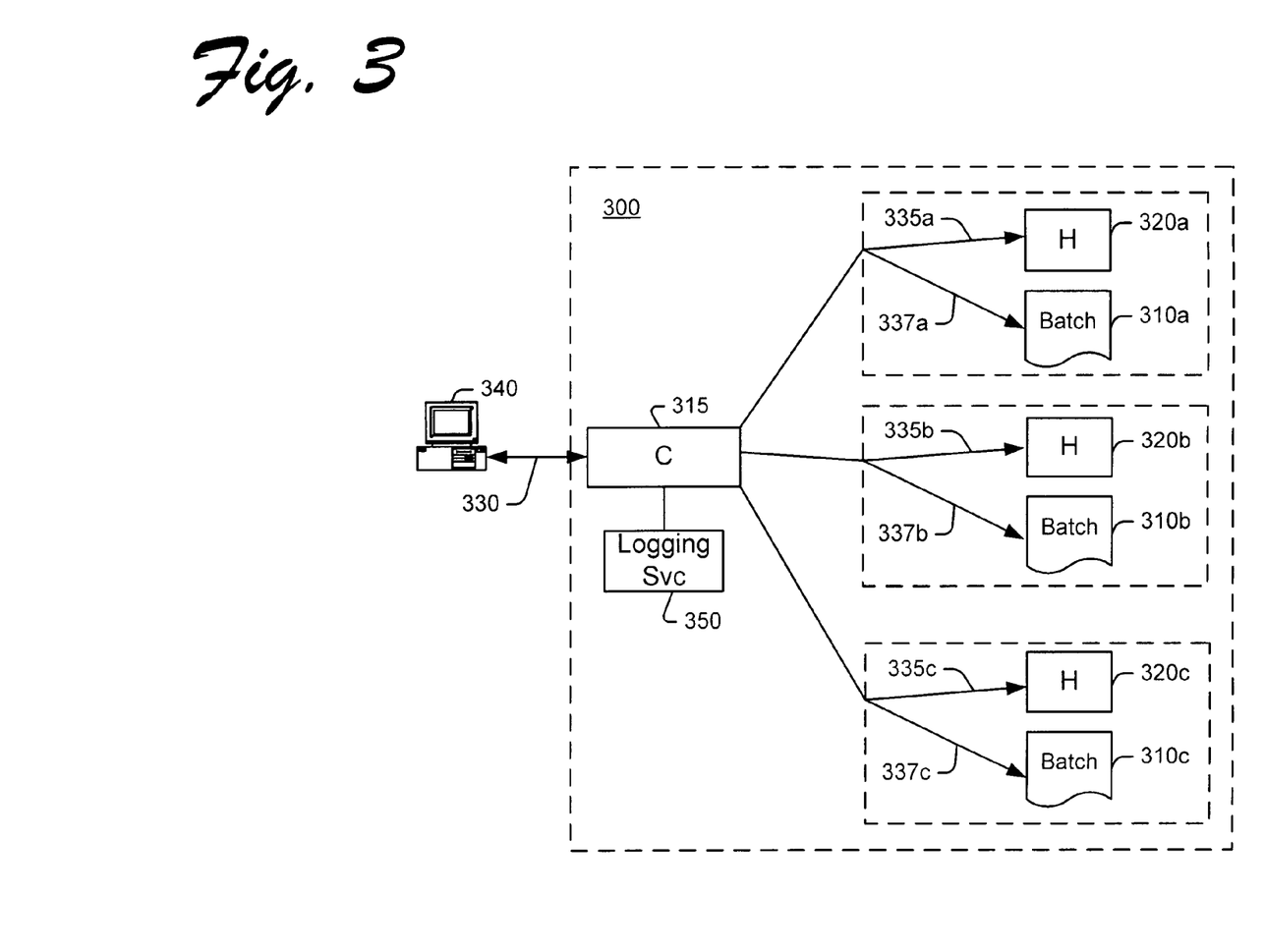
FIG. 3 is a high-level diagram of a virtual disk illustrating write operations to individual storage cells of the virtual disk and logging the write operations for each of the storage cells.

FIG. 3 is a high-level diagram of a virtual disk 300 illustrating write operations to individual storage cells 320a-c of the virtual disk 300, and logging the write operations for each of the storage cells 320a-c assigned as data handlers (H). During operation, one or more of the storage cells is assigned as the coordinator (C) (e.g., storage cell 315 in FIGS. 3a and 3b). All transactions (illustrated by arrows 330) between a client 340 and the virtual disk 300 are via the coordinator (C). The coordinator (C) retrieves data from the data handlers (H) 320a-c during read operations, and records data to the data handlers (H) 320a-c during write operations (also referred to as a "write" or "writes" and illustrated by arrows 335a-c).

A logging service 350 may be implemented by the data handlers (storage cells 320a-c) to record successful writes 335a-c in batches 310a-c, respectively. The logging service 350 may be implemented in hardware, computer software, firmware, or a combination thereof, e.g., residing in the distributed storage array itself or otherwise operatively associated with the distributed storage array, such as on the storage cells of the distributed storage array. In an exemplary embodiment, writes may be recorded (illustrated by arrows 337a-c) in the batches 310a-c. The writes recorded in batches 310a-c may then be copied or "replayed" to the remote storage.

In an exemplary embodiment, the batches 310a-c may be maintained close to the virtual disk 300, e.g., on the same storage cells 320a-c, and the data handler (H) does not return an acknowledgement to the client 340 until both writes are completed successfully. Accordingly, the writes to storage cells 320a-c and the writes logged in batches 310a-c are "atomic" in nature. Such a configuration helps ensure that the data recorded in the batches 310a-c is valid at the time of writing to the virtual disk 300.

Figure 4:
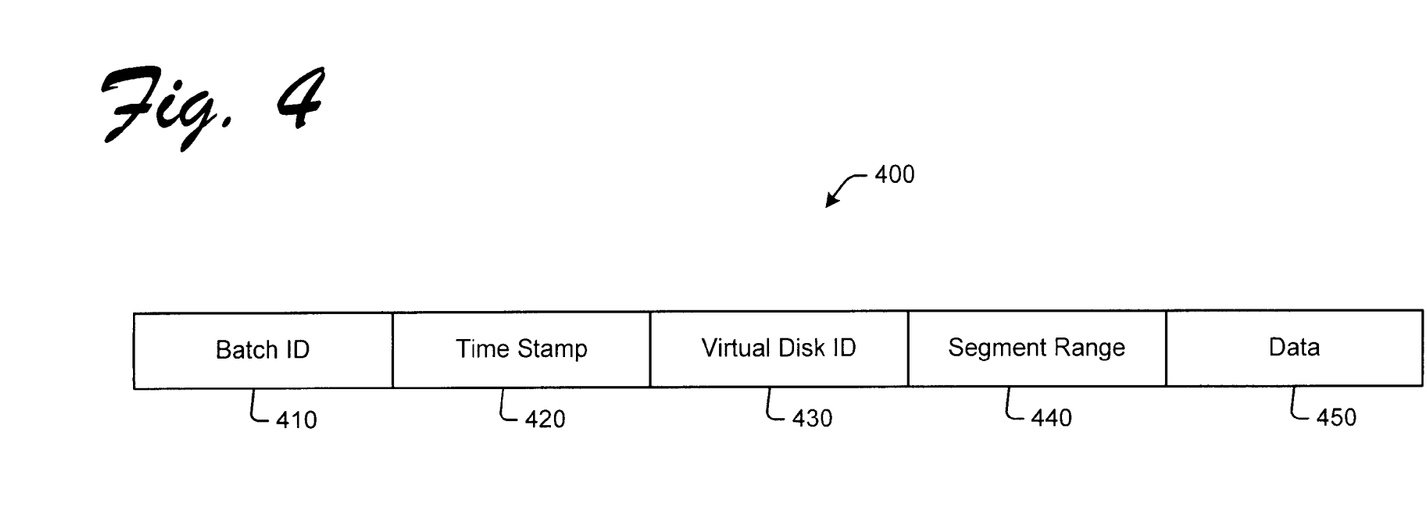
FIG. 4 shows an exemplary data structure which may be implemented as a batch for logging writes.

FIG. 4 shows an exemplary data structure 400 which may be implemented as a batch for logging writes. Batch entries 410-450 may be recorded in the batch 400 by the logging service. When a write completes at a virtual disk, the logging service (e.g., logging service 350 in FIG. 3) records the entire write command (including the data) in batch 400. Accordingly, the batch 400 can be replayed at the remote storage independent of the virtual disk on the source side.

In an exemplary embodiment, batch entries include a batch ID 410, a time stamp 420 indicating a time the entry was created in the batch, identification 430 of the virtual disk(s) being mirrored, a range of segments 440 for each write, and the corresponding data 450 for each write.

Batch ID 410 may be implemented to determine which batch is currently being used for logging writes, as explained in more detail below with reference to FIGS. 6 and 7. The timestamp 420 may be implemented if writes are to the same block of storage cells. The write protocols help ensure that the lower timestamps come before the higher timestamps, and enables write operations to be sorted for the same block.

In an exemplary embodiment, the batch 400 does not need to maintain order of the writes. Instead, the batch 400 only maintains a record of each write to the virtual disk during batching because the mirroring process only needs the last write recorded at the storage cells for each region of the virtual disk. Accordingly, the batch 400 may be coalesced to eliminate superseded writes, reducing batch size and improving efficiency (e.g., when the batch is transferred via the background network to remote storage).

It is noted that any size and/or number of batches 400 may be implemented for each of the data handlers (H). If a single batch is used, then all changes are replayed to the remote storage at about the same time, sacrificing write ordering during resynchronization. Alternatively, batch 400 may be divided into smaller increments to facilitate network transmission of the batches to remote storage, and to provide more frequent consistency points between the data stored on the virtual disks and the mirrored data at the remote storage.

In an exemplary embodiment, the batch 400 may be physically stored in random storage cells. Accordingly, the configuration and management component of the distributed storage array may be implemented to determine which storage cells are used for storing the batch. Additional API support is not needed to generate the batch 400. Instead, the storage cells write to the batch 400 using the same procedure for writing to other storage cells of the virtual disk.

In another embodiment, the batch 400 may be physically stored in "disjointed" storage cells, i.e., storage cells that are not a part of the corresponding virtual disk. Accordingly, the batch 400 may still be transferred to the remote storage even if one or more of the storage cells in the virtual disk fail after the batch has been assembled.

In another embodiment, the batch 400 may be physically stored in the IO coordinator (C) for the virtual disk. The coordinator (C) logs entries in a local batch after it has successfully received responses from the data handlers (H) and before acknowledging the write to the host. Hence, the entries are distributed among the IO coordinators (C). Communication is not needed between the IO coordinator (C) and the data handlers (H) because the logging takes place locally in the IO coordinator (C), thereby increasing efficiency. In addition, only writes that have completed successfully are logged.

In another embodiment, the batch 400 may be physically stored in the data handlers (H). The data handler (H) generates an entry in a local batch 400 after it has successfully written the data and before acknowledging a successful write to the coordinator (C). Hence, entries in the batch 400 are distributed among the data handlers (H), reducing communication between the coordinator (C) and the data handlers (H) and increasing efficiency. Redundancy is also provided, following the same scheme that is used for the rest of the data written to the data handler (H).

Disk space on the storage cells may be pre-allocated for the batches 400. In another exemplary embodiment, batches may be configured such that a predetermined number of entries are allowed in the batch 400. In either embodiment, more space may be dynamically allocated for the batch 400 during operation (e.g., "on the fly"), or the batch 400 may be "drained" (i.e., transferred to another storage cell or to the remote storage) and/or removed entirely from the storage cell to provide more disk space for data storage operations.

If the batch reaches maximum size and no additional disk space is available, e.g., during long disconnection periods from the remote storage, a fail-safe lock may be implemented. After switching to a fail-safe lock, all further write and log requests fail. In another embodiment, the batch may be abandoned and a full copy is initiated on recovery to resynchronize the virtual disk and remote storage. In yet another embodiment, a bitmap (not shown) may be used to record writes that follow after the last write logged in the batch 400.

A bitmap keeps track of which regions in the virtual disk have been changed since the time at which the bitmap was started. The bitmap does not keep a record of the written data, only the locations to which data was written The bitmap may be maintained concurrently with the batch or the bitmap may be generated by compacting the batch 400.

The batch 400 may be accessed via the native file system. In this embodiment, the batch is stored as a file in the native file system of the storage cell. Batch creation and removal is fast because global updates in the distributed storage array are not needed.

In another embodiment, the batch 400 may be stored as a virtual disk and accessed similarly to any of the other virtual disks in the distributed storage array. The existing write protocol may be implemented without specialized APIs. Redundancy for the batches is also provided, following the same mechanism that is used for the other data stored on the virtual disks.

Figure 5:
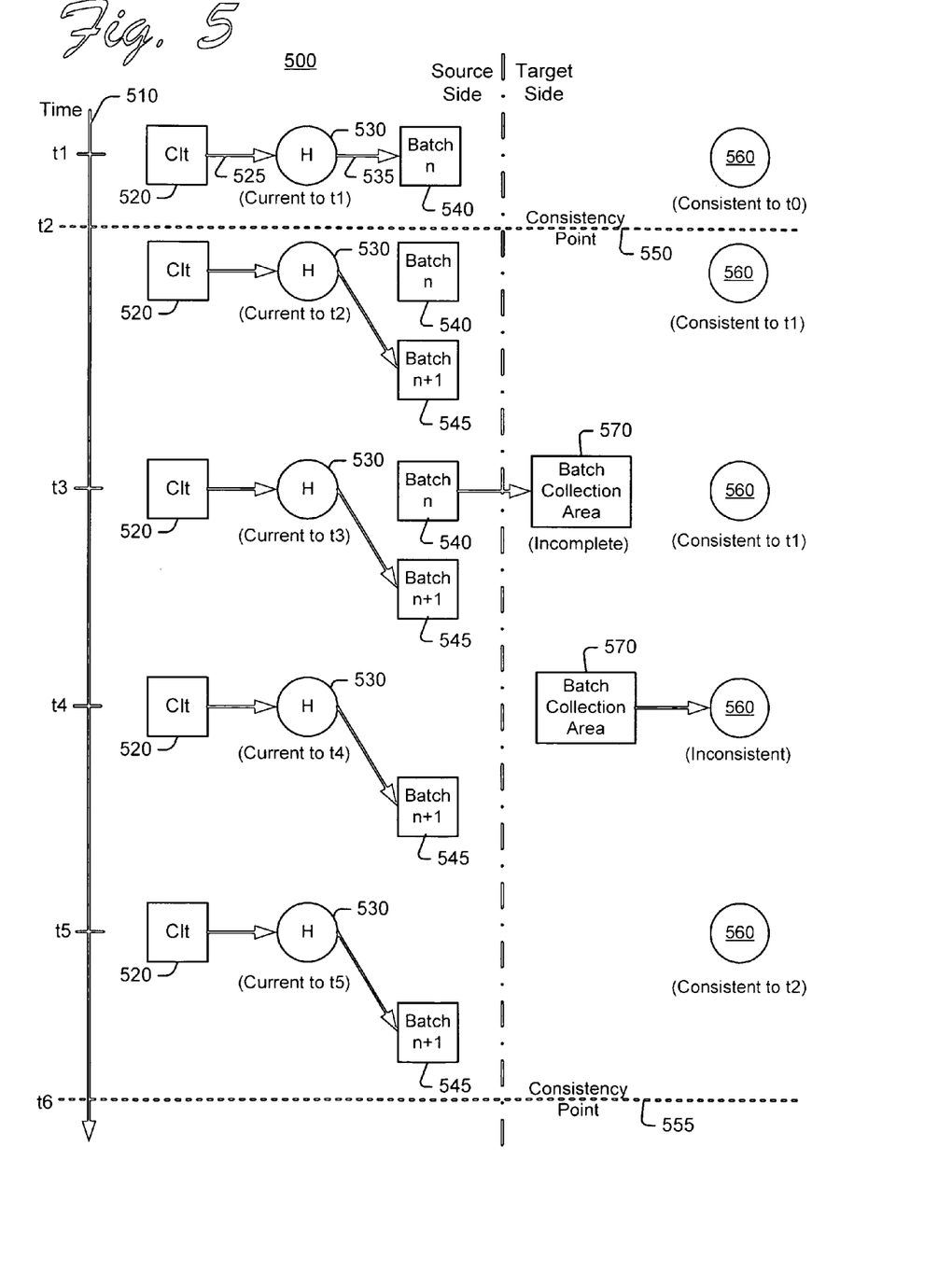
FIG. 5 is a timing diagram illustrating exemplary operations for asynchronous backup of virtual disks in a distributed storage array.

FIG. 5 is a timing diagram 400 illustrating exemplary operations for asynchronous backup of virtual disks in a distributed storage array. A timeline 510 is illustrated along the left-hand margin of the drawing, with time progressing from the top of the page (t1) to the bottom of the page (t6). "Snapshots" at each time (t1-t6) illustrate device operations at the distributed storage array ("source side") on the left-hand side of the drawing, and device operations at the remote storage ("target side") on the right-hand side of the drawing.

At time t1, client 520 may issue writes (illustrated by arrow 525) to a virtual disk, e.g., via coordinator (C) as discussed above with reference to FIG. 3. Data is recorded at a data handler (H) 530 during the write operation. When the data is successfully recorded at the data handler 530, the same data is also logged (illustrated by arrow 535) in a first batch 540.

Writes to the data handler 540 continue to be logged in the first batch 540 until a consistency point 550 is established at time t2. The consistency point 550 may be established by temporarily suspending the IO stream, e.g., by having the storage cells delay cache commits and write acknowledgements to the clients 520 for a predetermined time.

At the consistency point 550, all writes which completed prior to the consistency point 550 have been recorded in the first batch 540, and any writes which complete after the consistency point 550 are now logged to a new batch 545. Accordingly, the first batch 540 represents a complete image of all the writes which were completed on the source side up to time t2, and the first batch 540 is ready to be transferred to the remote storage 560.

At time t3, the first batch 540 may be transferred to the remote storage 560. In an exemplary embodiment, the first batch 540 is written to a batch collection area 570 (e.g., a temporary holding volume on the target side). None of the writes are committed to the remote storage 560 until the entire batch 540 has been received on the target side. Accordingly, the remote storage 560 remains consistent to time t1 (when it was last updated). If there is an error in the first batch 540, or the first batch 540 is otherwise corrupted (e.g., during transfer to the target side), the error can be corrected or the first batch 540 discarded without corrupting the remote storage 560.

At time t4, the first batch 540 has been successfully transferred to the batch collection area 570 on the target side. The first batch 540 may be removed from the source side, and the batch collection area 570 may be replayed to the remote storage 560. Accordingly, writes logged in the first batch 540 are mirrored by the remote storage up to the consistency point 550.

It is noted that during the time which batch collection area 570 is being replayed to the remote storage 560, the remote storage 560 may be in an inconsistent state. That is, the remote storage 560 is being updated with new writes from time t1 to time t2 and therefore is no longer consistent with the source side at any given time (e.g., time t1). However, if there is a failure on the target side (e.g., loss of power) which interrupts the replay of writes in the batch collection area 570, the data is still in the batch collection area 570 and can be recovered after the failure is corrected without having to retrieve the data again from the source side.

At time t5, the first batch 540 is fully applied to the remote storage 560, and the remote storage 560 contains a consistent image of the source side up to the consistency point 550 (time t2). The batch collection area 570 may be deleted.

Also during time t2 to t5, all of the writes by client 530 to data handler 530 have been logged in the new batch 545. Another consistency point 555 may be established at some time t6, and the process repeats to make the remote storage 560 consistent with the source side up to the new consistency point 555 (at time t6).

It is noted that batch transitions, such as those just described, may be initiated by selecting a consistency point 550, e.g., periodically, when a predetermined number of writes have been logged, or when the batch reaches a predetermined size. Selecting a consistency point 550 may depend at least to some extent on design considerations. For example, industry standards for mirroring data recommend a periodic update frequency of every 5 sec or less. In any event, selecting a consistency point 605 for batch transition helps ensure that when a new batch starts, no writes which completed prior to the changeover are logged in the new batch, and no writes which completed after the changeover are logged in the old batch.

Figure 6:
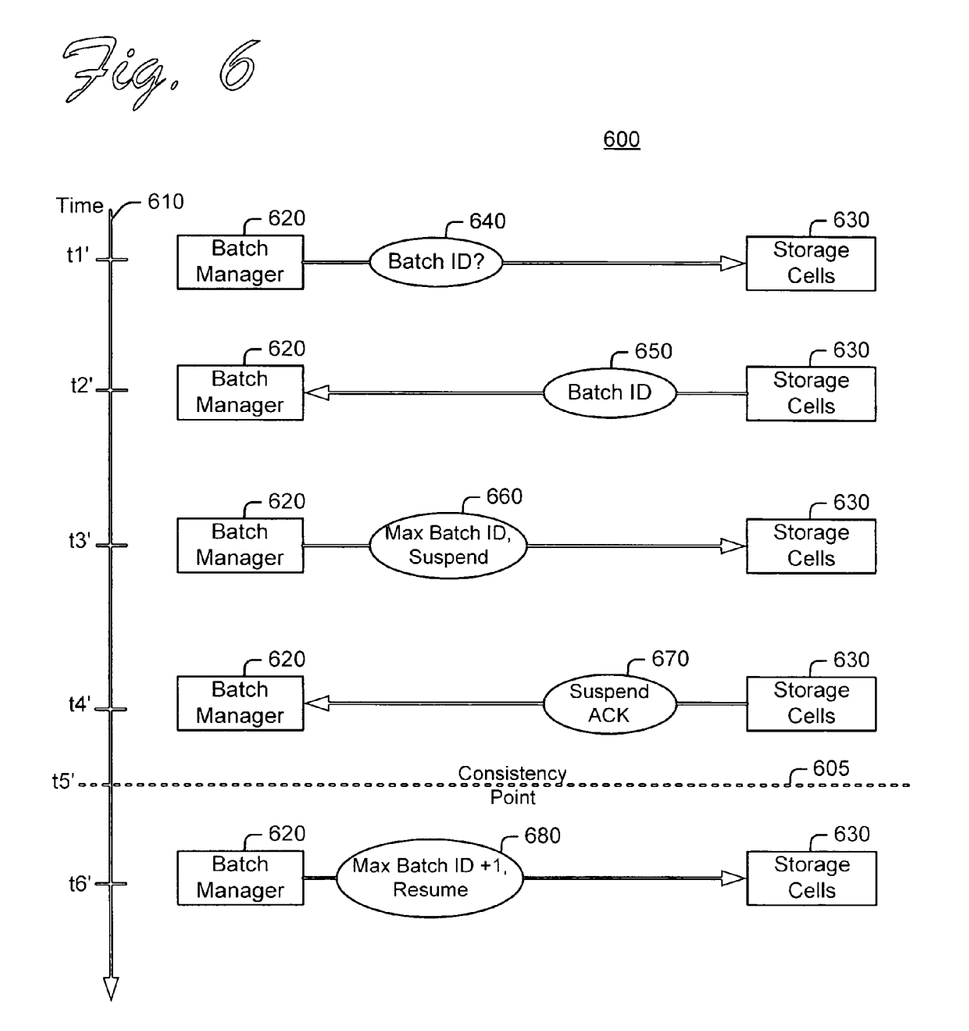
FIG. 6 is a timing diagram illustrating exemplary operations for establishing a consistency point in an IO stream for asynchronous backup of virtual disks in a distributed storage array.

FIG. 6 is a timing diagram 600 illustrating exemplary operations for establishing a consistency point 605 in an IO stream for asynchronous backup of virtual disks in a distributed storage array (e.g., the distributed storage array 100 in FIG. 1). A timeline 610 is illustrated along the left-hand margin of the drawing, with time progressing from the top of the page (t1') to the bottom of the page (t6'). It is noted that the time designations t1'-t6' are used in FIG. 6 to distinguish from the time designations t1-t6 referred to in FIG. 5. "Snapshots" at each time (t1' through t6') illustrate device operations at the distributed storage array.

During operation, a storage cell is elected as a batch manager 620. Batch manager 620 issues batch transition messages to the storage cells 630, receives replies from the storage cells 630, and suspends the IO stream if the IO stream is suspended for too long, IO requests may start to timeout. Therefore, in this embodiment the IO stream is only suspended for one network roundtrip (plus the amount of time it takes for the batch manager to generate a response), or half the amount of time required to perform a single write (one third, if the virtual disk is erasure coded and so includes a commit phase in the write operation). The slowest storage cell response determines the IO suspension time (and is typically on the order of microseconds). For example, turnaround time is about 50 microseconds if the storage cells are in the same rack, and about 150 microseconds if the storage cells are separated by about 10 km.

At time t1', the batch manager broadcasts a Query 640 to all of the storage cells 630. At time t2', each storage cell responds with its current Batch ID 650. The batch manager 620 takes the largest returned value, M, and increments it by one. At time t3', the batch manager 620 broadcasts the incremented batch number (i.e., Max Batch ID M+1) as a new batch ID 660. When the storage cells 630 receive this message, each storage cell 630 sets its own batch identifier to M+1, and suspends cache commit for any writes that are still pending, and for any incoming writes. At time t4', the storage cells 630 send an acknowledgement 670 to the batch manager 620 reporting that writes have been suspended. The batch manager 620 waits to receive responses from the storage cells 630 (e.g. from some or all, but at least enough responses that it can be inferred there are no writes proceeding during suspension). At time t5', sufficient responses are received by the batch manager 620 and a consistency point 605 is established. At time t6', the batch manager 620 broadcasts an instruction 680 to the storage cells 630 to resume cache commits using the new batch ID.

it is noted that one or more of the storage cells may have failed. Accordingly, the batch manager 620 may only wait to receive responses from a majority or quorum of each segment group. For example, if there are three storage cells coordinating in a single segment group, a response from two of these three storage cells indicates that a majority have been suspended. If one of the storage cells fails to respond, operations can still continue because a quorum will not be available to execute any writes.

If the batch manager 620 does not receive at least a quorum, the batch manager 620 may broadcast an instruction (not shown) to the storage cells 630 to resume cache commits using the old batch ID so that the system does not "hang." In the event that the batch manager 620 fails after the storage cells 630 have suspended writes, the suspend instruction may time out, the storage cells 630 may flush their caches and return to normal operation, again so that the system does not "hang." A new storage cell may be elected as batch manager 620 and operations may resume for establishing a consistency point 605. Writes in both batch M and batch M+1 are treated as the same batch. That is, both batches are drained and transmitted to the remote storage as one batch. Writes in the next batch are logged to batch M+2.

It is also noted that a write may be in the middle of being committed to cache at one or more of the storage cells 630 when writes are suspended. For example, three data handlers commit the write with a batch ID of M and three data handlers commit the write with a batch ID of M+1 in a 4+2 erasure coded virtual disk. In order to determine which batch the write actually belongs to, each data handler returns the batch ID of the write in the acknowledgement to their coordinator when the write is committed. The coordinator examines all the responses from the write operation, and determines if the write needs to be retried.

Figure 7:
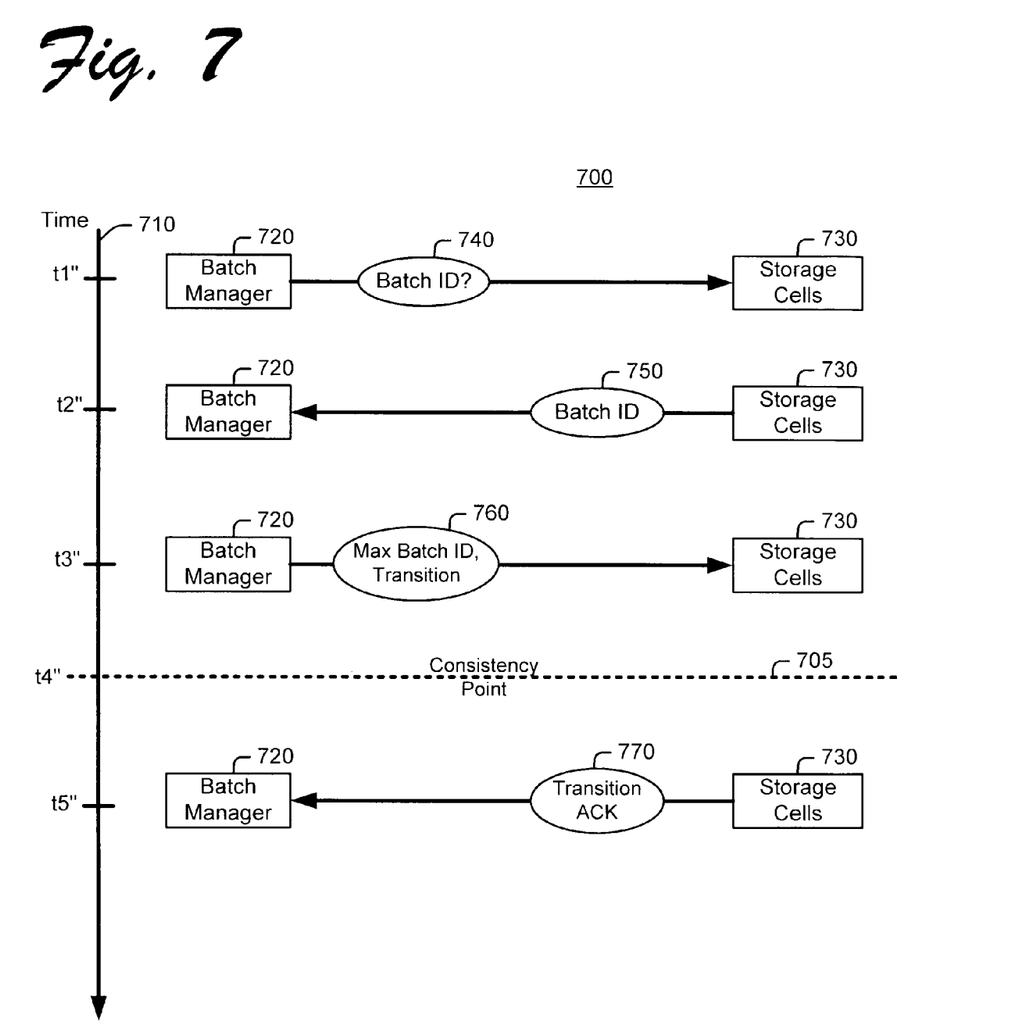
FIG. 7 is another timing diagram illustrating alternative exemplary operations for establishing a consistency point in an IO stream -for asynchronous backup of virtual disks in a distributed storage array.

FIG. 7 is a timing diagram 700 illustrating exemplary alternative operations for establishing a consistency point 705 in an IO stream for asynchronous backup of virtual disks in a distributed storage array (e.g., the distributed storage array 100 in FIG. 1). A timeline 710 is illustrated along the left-hand margin of the drawing, with time progressing from the top of the page (t1") to the bottom of the page (t5"). It is noted that the time designations t1"-t5" are used in FIG. 7 to distinguish from the time designations t1-t6 referred to in FIG. 5 and the time designations t1'-t5' referred to in FIG. 6. "Snapshots" at each time (t1" through t5") illustrate device operations at the distributed storage array.

During operation, a storage cell is elected to act as batch manager 720. Batch manager 720 issues batch transition messages to the storage cells 730, receives replies from the storage cells 730, and suspends the IO stream. In this embodiment, the IO stream may be suspended for maximum clock skew time. Timestamps from the storage cell clocks are used to determine which writes should be included in the current batch. For a crash consistent batch, write acknowledgements are suspended for a time equal to the maximum skew between the clocks of any two storage cells in the system.

At time t1", the batch manager 720 broadcasts a Query 740 to the storage cells 730. At time t2", each of the storage cells 730 respond with its current Batch ID 750. The batch manager 720 takes the largest returned value (M) and increments it by one (M+1). At time t3", the batch manager 720 broadcasts a batch transition order 760 to all of the storage cells 730, including the new batch ID (M+1), and a time in the future in which the transition to the new batch is going to take place (i.e., the consistency point 705, time t4"). Writes committed up to time t4" are included in the old batch. The storage cells 730 put all writes that have been acknowledged to the client(s) and have a timestamp up to time t4" in the old batch. The storage cells 730 then suspend write acknowledgements to the client(s) for a time equal to the maximum skew between any two clocks in the system. This helps ensure that writes for the old batch which are not in the old batch (e.g., because of a slow clock at a storage cell) are not acknowledged to the host. At time t5", the storage cells 730 issue a reply 770 to the batch manager 720 acknowledging the successful batch transition.

If the batch manager 720 receives a predetermined number of acknowledgements (e.g., from a quorum of each segment group), the batch transition is considered successful. The old batch can be drained and transmitted to the remote storage, and a successful batch transition is registered for the distributed storage array. If sufficient acknowledgements are not received, the batch transition is considered unsuccessful. Writes in the log with batch ID's of M and M+1 are drained and transmitted to the remote storage as one batch, and writes in the next batch are committed to a new batch (M+2).

It is noted that for this embodiment, failure of a batch manager does not affect operation of the other storage cells. The batch transition is simply not stored as a successful batch transition and therefore is not taken into account when draining the batch.

It is noted that the exemplary embodiments shown and described are provided for purposes of illustration and are not intended to be limiting. Still other embodiments are also contemplated for asynchronous backup of virtual disks in a distributed storage array.

The invention claimed is:

1. A method for batch transition during asynchronous backup of a distributed storage array, comprising:
    querying a plurality of storage cells in the distributed storage array for a current Batch ID;
    broadcasting the largest Batch ID incremented by one (M+1) to the plurality of storage cells in the distributed storage array;
    suspending cache commits for pending and incoming writes at the plurality of storage cells to establish a consistency point; and
    setting the Batch ID at the plurality of storage cells to the largest Batch ID incremented by one (M+1) for recording the pending and incoming writes in a new batch after the consistency point.

2. The method of claim further 1, comprising resuming cache commits to the new batch after establishing the consistency point.

3. The method of claim 1, further comprising establishing the consistency point only after a quorum of storage cells acknowledges that cache commits for the pending and incoming writes are suspended.

4. The method of claim 3, resuming cache commits for the pending and incoming writes without incrementing the Batch ID if the predetermined number of storage cells fails to acknowledge that the pending and incoming writes are suspended.

5. The method of claim 3, further comprising timing out the suspending of cache commits if a batch manager fails.

6. A method for batch transition during asynchronous backup of virtual disks in a distributed storage array, comprising:
    querying at least a quorum of storage cells in the distributed storage array for a current Batch ID;
    broadcasting the largest Batch ID incremented by one (M+1) along with a transition time to at least the quorum of storage cells in the distributed storage array;
    setting the Batch ID for at least the quorum of storage cells to the largest Batch ID incremented by one (M+1) at the transition time;
    logging completed writes having a timestamp prior to the transition time in an old batch; and
    logging completed writes having a timestamp at or after the transition time in a new batch.

7. The method of claim 6, further comprising suspending write acknowledgements to one or more clients for a time equal to the maximum skew between any two clocks in the distributed storage array for the transition time.

8. The method of claim 6, further comprising resuming write acknowledgements to one or more clients after the transition time.

9. The method of claim 6, further comprising acknowledging a successful batch transition after the transition time.

10. The method of claim 6, wherein logging completed writes in the new batch is only after a predetermined number of storage cells acknowledge receipt of the transition time.

11. The method of claim 10, further comprising resuming logging to the old batch if the predetermined number of storage cells fails to acknowledge receipt of the transition time.

* * * * *

UNITED STATES PATENT AND TRADEMARK OFFICE
CERTIFICATE OF CORRECTION

PATENT NO. : 7,376,805 B2  
APPLICATION NO. : 11/409471  
DATED : May 20, 2008  
INVENTOR(S) : Christopher Stroberger et al.

Page 1 of 1

It is certified that error appears in the above-identified patent and that said Letters Patent is hereby corrected as shown below:

On the Title page, in field (54), in "Title", in column 1, line 1, delete "DISTRIBUTED STORAGE ARRAY" and insert -- METHOD FOR BATCH PROCESSING DURING ASYNCHRONOUS DATA BACKUP IN A DISTRIBUTED STORAGE ARRAY --, therefor.

In column 1, line 1, in "Title" delete "DISTRIBUTED STORAGE ARRAY" and insert -- METHOD FOR BATCH PROCESSING DURING ASYNCHRONOUS DATA BACKUP IN A DISTRIBUTED STORAGE ARRAY --, therefor.

In column 3, line 23, after "storage cell" delete "200d" and insert -- 210d --, therefor.

Signed and Sealed this

Fifth Day of August, 2008

JON W. DUDAS  
*Director of the United States Patent and Trademark Office*